(12) United States Patent  
Tzeng

(10) Patent No.: US 12,212,267 B2
(45) Date of Patent: Jan. 28, 2025

(54) MOTOR CONTROLLER

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 182 days.

(21) Appl. No.: 18/084,520

(22) Filed: Dec. 19, 2022

(65) Prior Publication Data

US 2024/0204699 A1    Jun. 20, 2024

(51) Int. Cl.
*H02P 3/10*    (2006.01)
*H02P 6/24*    (2006.01)

(52) U.S. Cl.
CPC . *H02P 3/10* (2013.01); *H02P 6/24* (2013.01)

(58) Field of Classification Search
CPC .................................... H02P 3/10; H02P 6/24
See application file for complete search history.

(56) References Cited

U.S. PATENT DOCUMENTS

2010/0231147 A1    9/2010    Milesi

FOREIGN PATENT DOCUMENTS

| CN | 107659219 A | 2/2018 | |
|----|----|----|----|
| TW | M496896 U | 3/2015 | |
| WO | WO-2017134734 A1 * | 8/2017 | ............ B60T 8/1705 |

* cited by examiner

*Primary Examiner* — Karen Masih
(74) *Attorney, Agent, or Firm* — Winston Hsu

(57) ABSTRACT

A motor controller comprises a switch circuit, a control circuit, and a function pin. The switch circuit is coupled to a motor for driving the motor. The control circuit generates a plurality of control signals to control the switch circuit. The function pin is coupled to the control circuit for receiving a function signal. The function signal is configured to inform the motor controller to execute a braking function. The braking function enables a braking time to be a variable value.

25 Claims, 2 Drawing Sheets

MOTOR CONTROLLER

BACKGROUND OF THE INVENTION

1. Field of the Invention

The present invention relates to a motor controller, and more particularly, to a motor controller which may be applied to a single-phase or three-phase motor. The motor controller may be a fan motor controller.

2. Description of the Prior Art

Conventionally, the motor controller may possess a braking function, such that a motor can be braked to stationary. However, when executing the braking function, the braking time is a fixed value. If the motor load is changed from a light load to a heavy load, the motor may not be braked to stationary successfully by the fixed braking time. Thus, a new technology is needed to solve this issue.

SUMMARY OF THE INVENTION

According to the present invention, a motor controller which is capable of adjusting a braking time is provided. The motor controller is used for driving a motor. The motor may be a single-phase motor or three-phase motor. The motor controller comprises a switch circuit, a control circuit, and a function pin. The switch circuit is coupled to a motor for driving the motor, where the switch circuit comprises a plurality of upper-bridge switches and a plurality of lower-bridge switches. The control circuit generates a plurality of control signals to control the switch circuit. The function pin is coupled to the control circuit for receiving a function signal. The function signal is configured to inform the motor controller to execute a braking function. The braking function enables the braking time to be a variable value.

According to one embodiment of the present invention, when the function signal conforms to a first pattern, the control circuit may enable a braking mode, where the first pattern may be a predetermined pattern. The first pattern may comprise a first pulse, where a width of the first pulse may be greater than a predetermined time. The first pattern may further comprise a second pulse, where a width of the second pulse may be greater than a predetermined time. When the function signal conforms to a second pattern, the control circuit may keep executing the braking mode. The second pattern may be adjacent to the first pattern. The second pattern may comprise N pulse(s). N is a positive integer. N is greater than or equal to 1. Moreover, a duration time of the second pattern may correlate with the braking time. When the duration time of the second pattern increases, the braking time increases. When the function signal no more conforms to the second pattern, the control circuit may terminate the braking mode. A system may adjust the braking time according to a motor load. Thus, the motor controller may enable the motor to be braked to stationary successfully.

According to one embodiment of the present invention, the control circuit may turn on the plurality of upper-bridge switches and turn off the plurality of lower-bridge switches so as to execute the braking function. Also, the control circuit may turn off the plurality of upper-bridge switches and turn on the plurality of lower-bridge switches so as to execute the braking function. The function signal may be a direction control signal, a signal related to a motor speed, or a motor-specific function signal. Furthermore, the function signal may be a multi-function signal. The function pin may be a multi-function pin. The motor controller may be implemented in an integrated circuit chip. When the motor controller is implemented in the integrated circuit chip, a pin count of the integrated circuit chip can be saved by installing the multi-function pin. The motor controller may be a fan motor controller.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
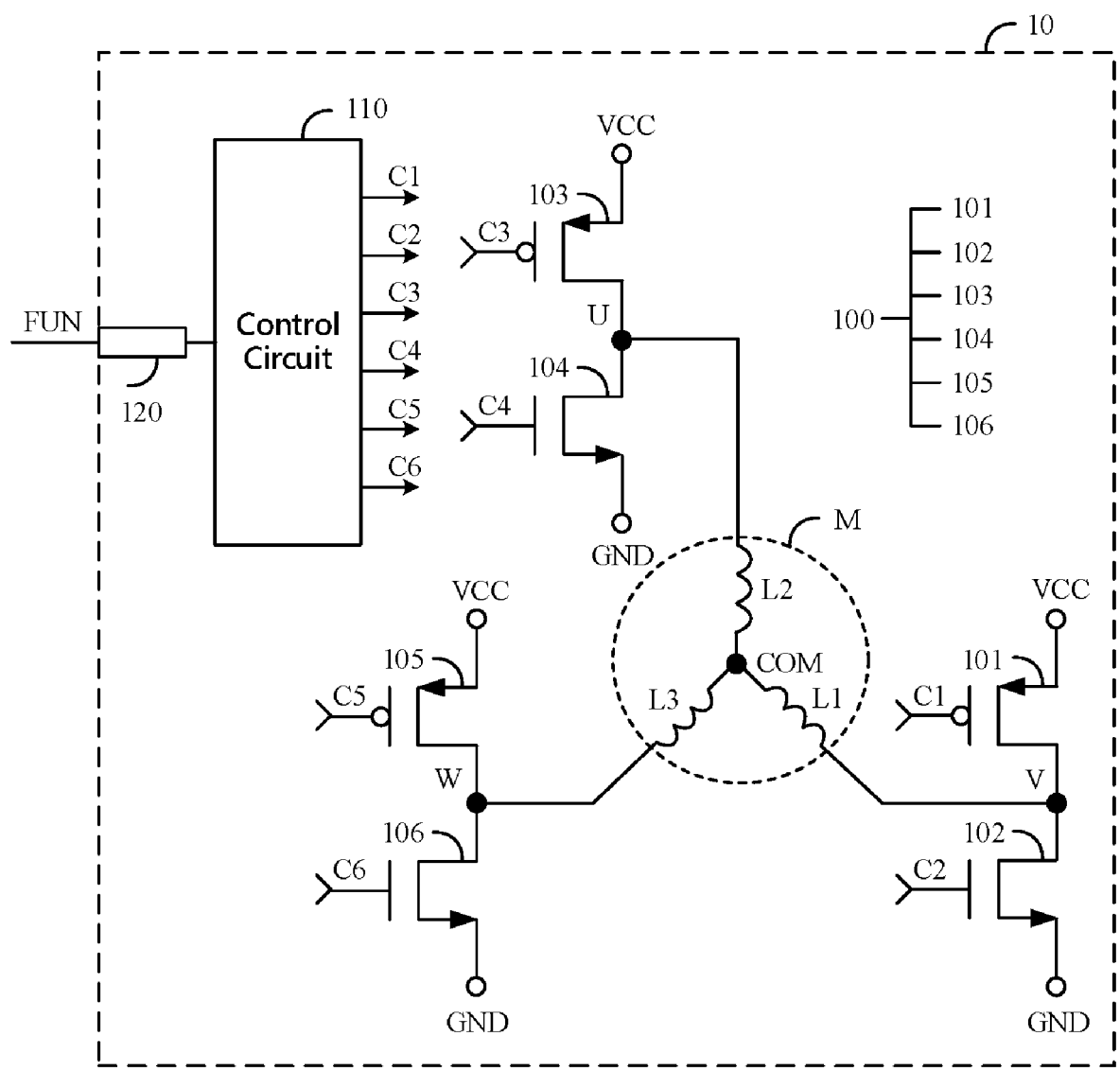
FIG. 1 is a schematic diagram showing a motor controller according to one embodiment of the present invention.

FIG. 1 is a schematic diagram showing a motor controller 10 according to one embodiment of the present invention. The motor controller 10 is used for driving a motor M, where the motor M may have a first coil L1, a second coil L2, and a third coil L3. According to one embodiment of the present invention, the motor M may be a three-phase motor. The motor controller 10 comprises a switch circuit 100, a control circuit 110, and a function pin 120. The switch circuit 100 may include a first transistor 101, a second transistor 102, a third transistor 103, a fourth transistor 104, a fifth transistor 105, a sixth transistor 106, a first terminal V, a second terminal U, a third terminal W, a fourth terminal VCC, and a fifth terminal GND, where the switch circuit 100 is coupled to the motor M for driving the motor M. The first transistor 101 is coupled to the fourth terminal VCC and the first terminal V while the second transistor 102 is coupled to the first terminal V and the fifth terminal GND. The third transistor 103 is coupled to the fourth terminal VCC and the second terminal U while the fourth transistor 104 is coupled to the second terminal U and the fifth terminal GND. The fifth transistor 105 is coupled to the fourth terminal VCC and the third terminal W while the sixth transistor 106 is coupled to the third terminal W and the fifth terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET. Each of the first transistor 101, the third transistor 103, and the fifth transistor 105 may be an upper-bridge switch. Each of the second transistor 102, the fourth transistor 104, and the sixth transistor 106 may be a lower-bridge switch. Moreover, the fourth terminal VCC has an input voltage, where the input voltage may be a power supply voltage. The fifth terminal GND has a ground voltage. The system may provide the input voltage for the motor controller 10 via the fourth terminal VCC, thereby enabling the motor controller 10 to work normally. For example, the input voltage may be 12 volts and the ground voltage may be 0 volt. Therefore, the motor controller 10 may be applied to a high voltage configuration.

The first coil L1 is coupled to the first terminal V and a sixth terminal COM. The second coil L2 is coupled to the second terminal U and the sixth terminal COM. The third coil L3 is coupled to the third terminal W and the sixth terminal COM. That is to say, the first coil L1, the second coil L2, and the third coil L3 form a Y-shaped configuration. The control circuit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The function pin 120 is coupled to the control circuit 110 for receiving a function signal FUN.

Figure 2:
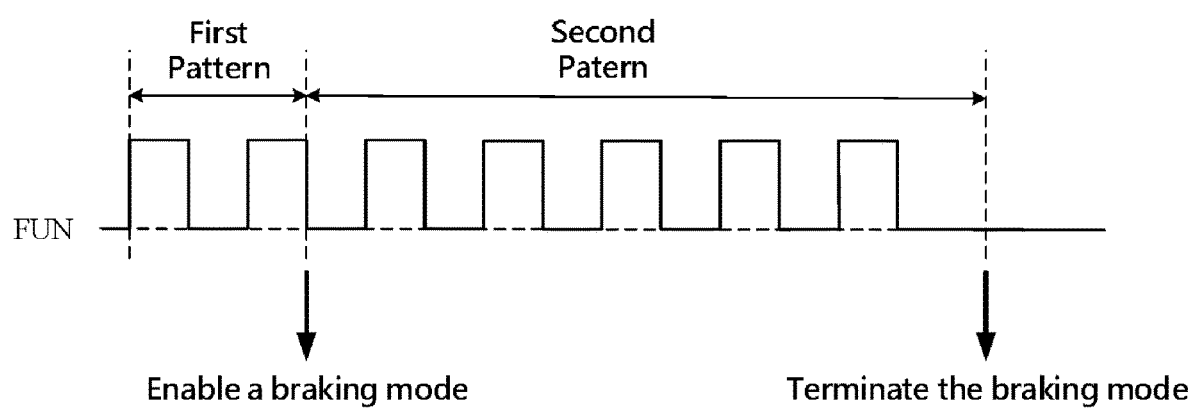
FIG. 2 is a timing chart according to one embodiment of the present invention.

FIG. 2 is a timing chart according to one embodiment of the present invention. The function signal FUN may be configured to inform the motor controller 10 to execute a braking function, where the braking function enables a braking time to be a variable value. According to one embodiment of the present invention, when the function signal FUN conforms to a first pattern, the control circuit 110 may enable a braking mode, where the first pattern may be a predetermined pattern. The first pattern may comprise a first pulse and a second pulse. Moreover, in order to avoid an incorrect operation resulting from noise, a width of the first pulse may be greater than a predetermined time and a width of the second pulse may be greater than the predetermined time, where the predetermined time may be 16 microseconds. According to one embodiment of the present invention, the first pattern may comprise a variation from a low level to a high level. Similarly, the first pattern may comprise a variation from a high level to a low level as well.

According to one embodiment of the present invention, when the function signal FUN conforms to a second pattern, the control circuit 110 may keep executing the braking mode. The second pattern may be adjacent to the first pattern. The second pattern may comprise N pulse (s), where N is a positive integer. N is greater than or equal to 1. In addition, a duration time of the second pattern may correlate with the braking time. For example, when the duration time of the second pattern increases, the braking time increases. When the function signal FUN no more conforms to the second pattern, the control circuit 110 may terminate the braking mode. Thus, the system may adjust the braking time according to the motor load. When the motor load is a light load, the system enables the braking time to be shorter via the function signal FUN. On the contrary, when the motor load is a heavy load, the system enables the braking time to be larger via the function signal FUN, such that the motor M may be braked to stationary successfully. According to one embodiment of the present invention, the first pattern may be configured to adjust the braking time as well. For example, when a duration time of the first pattern increases, the braking time increases. That is, the second pattern may be ignored.

More specifically, the motor controller 10 may execute the braking function by the embodiments as follows:
1. The control circuit 110 turns on the first transistor 101, the third transistor 103, and the fifth transistor 105 while turns off the second transistor 102, the fourth transistor 104, and the sixth transistor 106. At this moment the energy stored in the motor coils is discharged so as to execute the braking function.

2. The control circuit 110 turns off the first transistor 101, the third transistor 103, and the fifth transistor 105 while turns on the second transistor 102, the fourth transistor 104, and the sixth transistor 106. At this moment the energy stored in the motor coils is discharged so as to execute the braking function.

According to one embodiment of the present invention, the function signal FUN may be a direction control signal, where the direction control signal may be configured to control a forward direction and a reverse direction of a fan. Furthermore, the function signal FUN may be a signal related to a motor speed or a motor-specific function signal. Therefore, the function signal FUN may be a multi-function signal, where the multi-function signal may be configured to execute an original function or the braking function. That is, the function pin 120 may be a multi-function pin, where the multi-function pin may be configured to execute an original function or the braking function. Also, the motor controller 10 may be implemented in an integrated circuit chip. When the motor controller 10 is implemented in the integrated circuit chip, a pin count of the integrated circuit chip can be saved by installing the multi-function pin.

According to one embodiment of the present invention, the motor controller 10 may be applied to a single-phase motor, a three-phase motor, a DC motor, or a brushless motor. Moreover, the motor controller 10 may be a fan motor controller for driving a fan motor. Based on the above disclosure, the motor controller 10 may enable the motor M to be braked to stationary successfully by adjusting the braking time.

While the present invention has been described by the preferred embodiments, it is to be understood that the invention is not limited to the disclosed embodiments. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A motor controller, wherein the motor controller is configured to drive a motor, and the motor controller comprising:
 a switch circuit, coupled to the motor for driving the motor;
 a control circuit, configured to generate a plurality of control signals to control the switch circuit; and
 a function pin, coupled to the control circuit for receiving a direction control signal, wherein the direction control signal is configured to inform the motor controller to execute a braking function, the direction control signal is configured to control a forward direction and a reverse direction of a fan, and the braking function enables a braking time to be a variable value.
2. The motor controller of claim 1, wherein when the direction control signal conforms to a first pattern, the control circuit enables a braking mode.
3. The motor controller of claim 2, wherein the first pattern is a predetermined pattern.
4. The motor controller of claim 2, wherein the first pattern comprises a first pulse.

5. The motor controller of claim 2, wherein the first pattern comprises a variation from a low level to a high level.

6. The motor controller of claim 2, wherein the first pattern comprises a variation from a high level to a low level.

7. The motor controller of claim 4, wherein a width of the first pulse is greater than a predetermined time.

8. The motor controller of claim 4, wherein the first pattern further comprises a second pulse.

9. The motor controller of claim 8, wherein a width of the second pulse is greater than a predetermined time.

10. The motor controller of claim 2, wherein when the direction control signal conforms to a second pattern, the control circuit keeps executing the braking mode.

11. The motor controller of claim 10, wherein the second pattern is adjacent to the first pattern, the second pattern comprises N pulse(s), N is a positive integer, and N is greater than or equal to 1.

12. The motor controller of claim 10, wherein a duration time of the second pattern correlates with the braking time.

13. The motor controller of claim 12, wherein when the duration time of the second pattern increases, the braking time increases.

14. The motor controller of claim 10, wherein when the direction control signal no more conforms to the second pattern, the control circuit terminates the braking mode.

15. The motor controller of claim 1, wherein a system adjusts the braking time according to a motor load.

16. The motor controller of claim 1, wherein the motor controller enables the motor to be braked to stationary successfully.

17. The motor controller of claim 1, wherein the switch circuit comprises a plurality of upper-bridge switches and a plurality of lower-bridge switches, and the control circuit turns on the plurality of upper-bridge switches and turns off the plurality of lower-bridge switches so as to execute the braking function.

18. The motor controller of claim 1, wherein the switch circuit comprises a plurality of upper-bridge switches and a plurality of lower-bridge switches, and the control circuit turns off the plurality of upper-bridge switches and turns on the plurality of lower-bridge switches so as to execute the braking function.

19. The motor controller of claim 1, wherein the motor controller is implemented in an integrated circuit chip.

20. The motor controller of claim 1, wherein the motor controller is applied to a high voltage configuration.

21. The motor controller of claim 1, wherein the motor controller is applied to a single-phase motor.

22. The motor controller of claim 1, wherein the motor controller is applied to a three-phase motor.

23. The motor controller of claim 1, wherein the motor controller is applied to a DC motor.

24. The motor controller of claim 1, wherein the motor controller is applied to a brushless motor.

25. The motor controller of claim 1, wherein the motor controller is a fan motor controller.

* * * * *